United States Patent [19]

Fu

[11] Patent Number: 5,208,849

[45] Date of Patent: May 4, 1993

[54] METHOD OF AND APPARATUS FOR PRIVATE TELEPHONE AUTOMATIC LOCATING AND ANSWERING

[75] Inventor: Wong K. Fu, Kowloon, Hong Kong

[73] Assignee: Star Paging (Communications Equipment) Manufacturing Ltd., Kowloon, Hong Kong

[21] Appl. No.: 777,749

[22] Filed: Oct. 16, 1991

[30] Foreign Application Priority Data

Aug. 19, 1991 [CN] China .................. 91105913

[51] Int. Cl.⁵ .............. H04M 1/57; H04M 1/64
[52] U.S. Cl. ................. 379/70; 379/56; 379/157
[58] Field of Search .......... 379/157, 70, 72, 79, 379/56, 57, 58

[56] References Cited

U.S. PATENT DOCUMENTS 4,172,969 10/1979 Levine et al. .................. 379/70
4,680,785 7/1987 Akiyama et al. ............... 379/57
4,737,979 4/1988 Hashimoto .................. 379/70 X

FOREIGN PATENT DOCUMENTS 2158678 11/1985 United Kingdom .

*Primary Examiner*—Stafford Schreyer
*Attorney, Agent, or Firm*—Willian Brinks Olds Hofer Gilson & Lione

[57] ABSTRACT

A method of and an apparatus for private telephone automatic locating and answering. By installing at a receiver's location, an apparatus for automatic telephone locating and answering, the receiver not only can talk to the caller using a telephone set provided by the apparatus, but the apparatus can also automatically dial up a paging center to locate the receiver. Then the receiver may dial up his own automatic locating apparatus, to hold conversation.

7 Claims, 3 Drawing Sheets

METHOD OF AND APPARATUS FOR PRIVATE TELEPHONE AUTOMATIC LOCATING AND ANSWERING

The present invention relates to the method of and apparatus for telephone answering, in particular to the method of and apparatus for private telephone automatic locating and answering. Hereinafter the method is called the "method of automatic telephone locating" for short, and the product that carries out this method is named the "apparatus for private telephone automatic locating and answering".

With the abundance of existing information and the advance of telecommunications today, everyone hopes to glean the latest and most accurate intelligence by means of high-tech instruments and apparatuses. Current facilities of telecommunications have been available in the form of telegraphy, satellite communication, television broadcasting, network and radio telephony, facsimile, paging system, etc. Various kinds of telecommunication, both unidirectional and bidirectional, are all designed for efficient delivery of messages to desired locations. Most of the communication apparatus are installed at fixed locations. Only by gaining access to an apparatus (or to the location) can one receive the delivered message. Also, only a few apparatus like mobile phone and pager are portable, and are available for communication use any time and anywhere. These two portable types of telecommunication have their respective shortcomings: with the mobile phones, the receiver can by no means know who has dialled the call, hence can not screen off undesired calls; and with the pager, the receiver only knows who has paged, yet without being able to communicate with the caller immediately. Consequently, one may have to carry both portable apparatuses with him, and the potential callers have to record or memorise a sizable list of phone numbers, like home phone number, office phone number, paging centre number, mobile phone number and so on, and perhaps have to dial quite a number of times before a call can be successfully put through to the receiver. As a result, timely values of some useful information may considerably be discounted after a period of time-consuming locating dialling.

In order to overcome the above shortcomings, the present inventor has come up with a "method of automatic telephone locating". The "method of automatic telephone locating" has its advantage of an added locating function on top of the ordinary paging function of a Direct Line telephone system, and, further than that, the method also successfully provides a function to enable the caller to sufficiently memorise a single telephone number {of any receiver} by means of which the intended receiver will automatically be located, and yet another function to enable the receiver to selectively answer any phone call. The method allows a man active in business to effectively communicate with his people as desired, to obtain timely information and to improve productivity.

Therefore, the first object of this invention is to provide a method of and apparatus for automatic telephone locating, that, in association with the paging function {of a Direct Line phone system}, allows the caller to communicate with a receiver using a single telephone number.

The second object of this invention is to provide a method of and apparatus for automatic telephone locating, so that it does not matter whether the receiver being nearby the apparatus of the present invention or otherwise, the caller are always in a position to complete a call through his own apparatus for automatic telephone locating apparatus, and to selectively talk to a caller over the phone.

The third object of this invention is to provide a method of and apparatus for automatic telephone locating, to be used in conjunction with CT-2 (Cordless Telephone-2) telephone network currently under development, so that two owners of CT-2 telephones may talk to each other through the automatic telephone locating apparatus of the present invention.

By the present invention of the method of automatic telephone locating, an automatic telephone locating apparatus is installed at a receiver's location, carrying out operations in the following steps:

1. The caller dials the receiver's phone number of the "automatic telephone locating apparatus" thereby connects his phone to said apparatus through a telephone line.

2. The receiver in the neighbourhood of the apparatus may talk to the caller immediately by picking up the handset provided on the apparatus.

3. Should the receiver not be around and the call not be answered over a predetermined period of time, the apparatus keeps in contact with the caller on the one hand, and on the other hand automatically dials up a paging centre through another phone line, and leaves verbal message therein.

4. The paging centre calls the receiver through a pager, advising him that someone is waiting to talk to the receiver through the receiver's automatic locating apparatus.

5. The receiver dials the number of his own automatic telephone locating apparatus to connect his phone with the apparatus, and then connects with the caller.

6. Where the receiver refrains from responding to his own "automatic telephone locating apparatus", after a predetermined period of time, the apparatus dials up the paging centre again, so as to take message direct from the caller. After A, when the receiver gets the pager message at the second time he is able to identify the caller, then he can choose to call back or, otherwise, to take no further action.

This invention further provides an apparatus that carries out the method of automatic telephone locating, comprising:

three sockets interfacing the telephone network: one socket for connecting with a private telephone, one socket for connecting with the paging centre or for the receiver to dial back, and yet another socket for the caller to dial up the apparatus, a CPU system, for executing programs, for storing automatic answering voice and musical data, and for controlling the operation of the whole apparatus, a D/A and A/D voice converters, controlled by the CPU system, for D/A-converting the prerecorded automatic answering voice and musical data from CPU memory, also for amplifying, outputting, and A/D-converting the prerecorded answering voice and music, and for storing data into the RAM of CPU system.

a telephone interface controlled by CPU for connecting a telephone line to the network, and a front panel coupled with the CPU system, whereupon pilot lamps are provided to indicate the operating status of the automatic locating apparatus.

Figure 1:
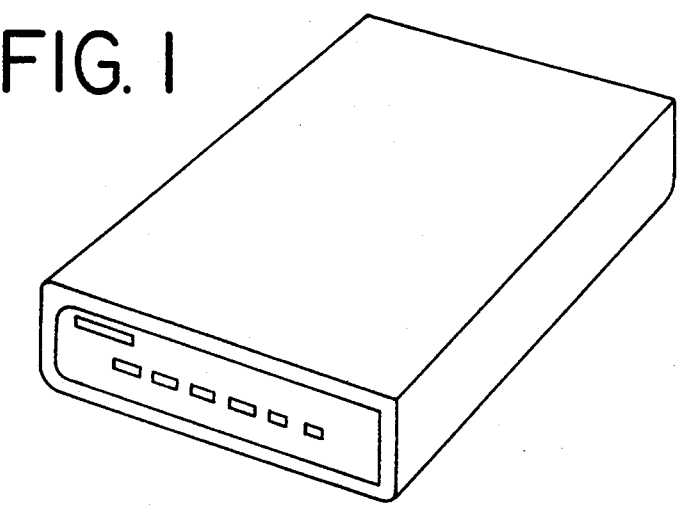
FIG. 1 shows the outlook of the present invention of an automatic locating and answering apparatus.

FIG. 1 shows the present invention of private telephone automatic locating and answering apparatus, in the form of a cuboid, but it may take any arbitrary form in design as required by the users. The front panel of the apparatus has a number of pilot lamps, indicating the function in operation or the status of the operation. In one of the embodiment examples of this invention, 6 pilot lamps are provided.

Figure 2:
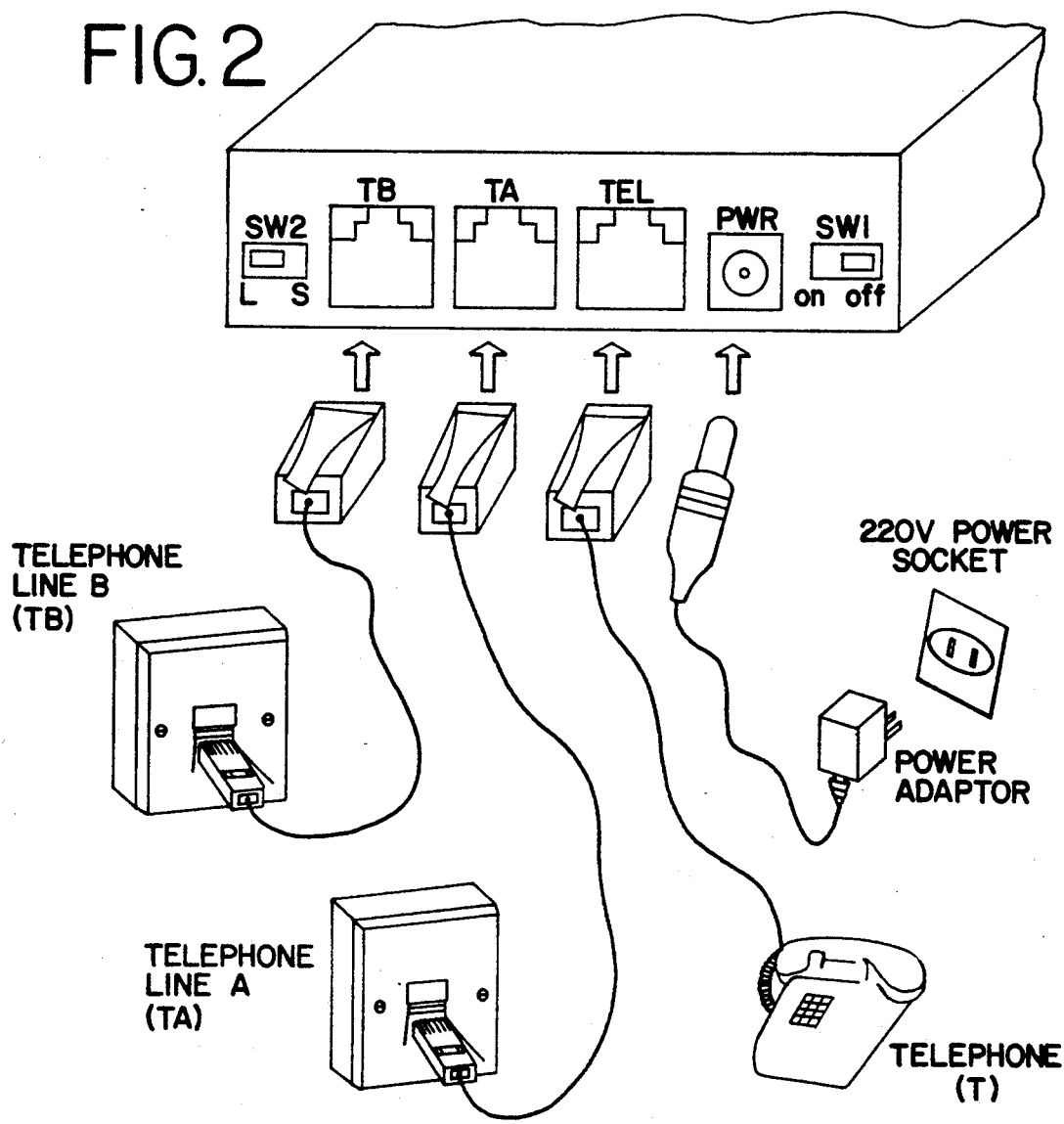
FIG. 2 shows the connections of the present invention of the apparatus, with a private telephone and two C.O. line (or extensions).

FIG. 2 shows the outside connections of the present invention of an apparatus for private telephone automatic locating and answering. The rear panel of the apparatus has three telephone sockets T, Ta and Tb. T connects with the owner's private telephone, and Ta and Tb connect with respective telephone lines (either C.O. lines or extensions).

Figure 3:
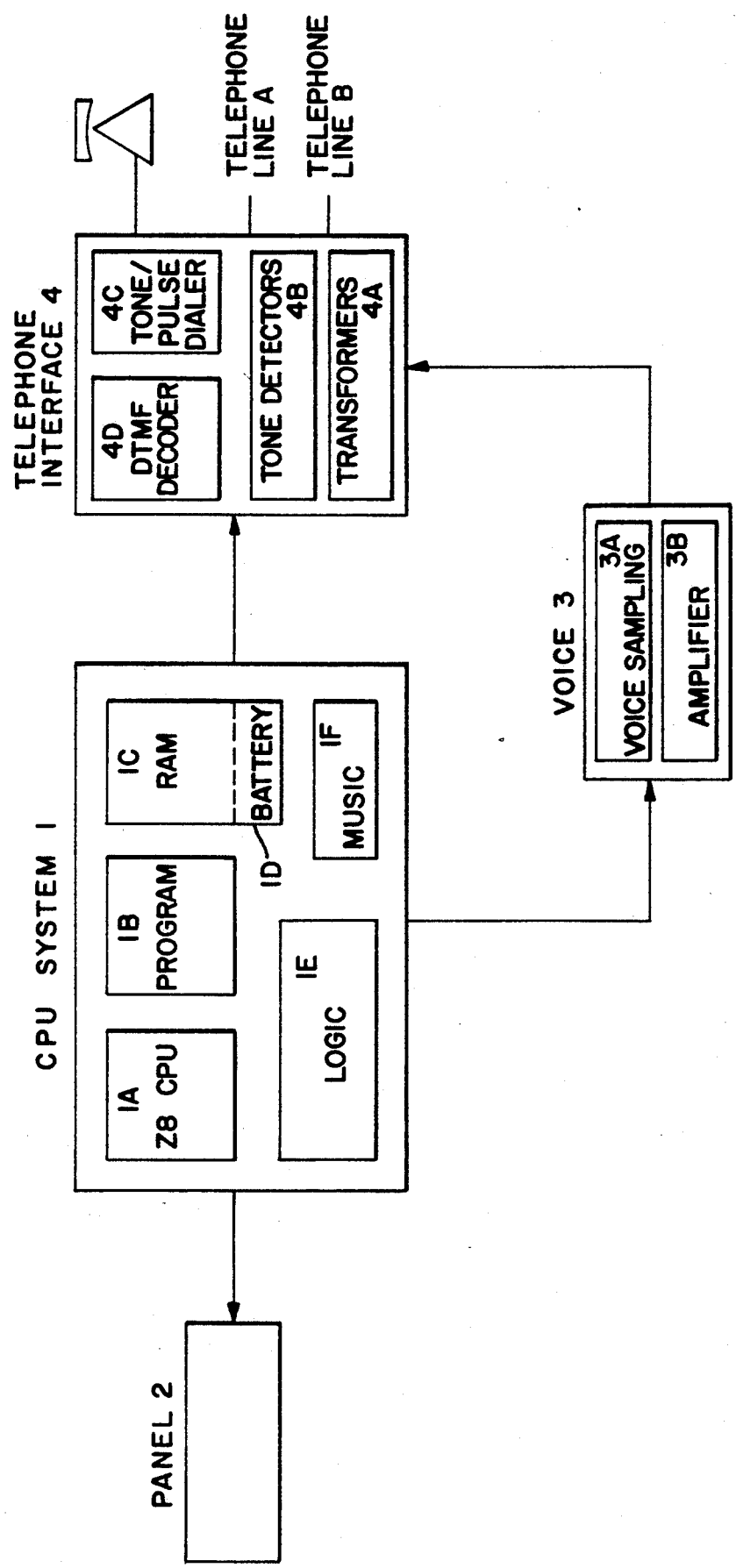
FIG. 3 is an internal function block diagram of the present invention of the apparatus.

FIG. 3 is a block diagram of the internal structure of the present invention of the apparatus for private telephone automatic locating and answering.

1 is the CPU system, in which a programmable Z8 CPU 1A, through a controllable bus, an 8-bit data bus and a 16-bit address bus, connects with a ROM 1B that stores all pre-programmed instructions and with a RAM 1C that stores various telephone information (like phone numbers) and data for the answering voice and music, etc. A standby battery 1D is used for emergency power supply to RAM and for keeping the stored information as long as necessary. The various buses of the CPU connect, via logic circuit 1E like latch circuit and delay circuit, with the associated component parts, like panel pilots, with voice A/D and D/A converter, and with the telephone interface. All these connections are well known technology of the art, and further descriptions are not needed here. 2 is the front panel with a number of LED lamps, which, according to our embodiment examples (see FIG. 2) are six in total, being, respectively, power indicator, error indicator, readiness status indicator, programs-loaded indicator, Ta and Tb line activeness indicators. These lamps are for displaying the connections between telephone sockets and C.O. lines and the status of power supply and of the system during the checking period under CPU controlling program execution. The voice, when answering through Ta, is generated by the voice data in the CPU system RAM, and is converted to analog signals by a voice converter 3. The analog signals are delivered to line Ta connected with 4. When the user desires to prerecord the answering voice, he should dial up the CPU system via line Tb and the CPU system will send the voice (input via Tb) to the A/D voice converter, and stored the converted data in the RAM. Telephone interface 4 does not connect directly with Ta or Tb, but is coupled with Ta or Tb via small transformers 4A. The status of telephone lines are monitored by a tone detector 4B and are timely reflected to the CPU that works in accordance with a pre-programmed sequence. When the user inputs information (like a paging centre number) through a push-button telephone set, the tone is converted by a DTMF decoder 4D into data for RAM storage. When the system is activated by a call dialling through line Ta, the system keeps in contact with the caller, and also connects, via tone/pulse dialler 4C, with the paging centre through line Tb, and takes message for later relaying to the caller.

The following three process examples illustrate the method of automatic locating and answering.

PROCESS 1

The apparatus for automatic locating and answering, serving a single owner.

The caller K dials the owner Q of the apparatus through C.O. line Ta. If the owner Q happens to be around, he then picks up the handset connected in T, and starts conversing with the caller K. If the owner Q is not around, the "apparatus for automatic telephone locating and answering" then automatically tells caller K to wait, and at the same time dials up a specified paging centre through telephone line Tb. The paging centre then pages the owner Q letting him know that someone is trying to talk to him through his apparatus for automatic locating and answering. The owner Q can dial up, with any phone available including a portable telephone, line Tb to make connection with the apparatus for automatic locating and answering, and can talk directly to caller K via line Ta. If the owner, for some reasons (e.g. unwilling to answer or no nearby telephone available), does not answer the phone after a predetermined time period (e.g. one minute), or does not talk to the caller K via line Tb, then the apparatus for automatic locating and answering automatically dials up the paging centre, requesting caller K to talk directly or leave message with the paging centre or with the secretary or telephone operator before hangs up the line. The owner Q, on receipt of the paging and, based on the message, decides whether he should talk to the caller K. In this process, if the owner Q returns to the apparatus location, and he picks up the private phone set on the apparatus to answer K's call, then the apparatus no longer functions to locate.

All data related to the apparatus for automatic locating and answering, e.g. the paging centre phone number, and call number for owner Q, are entered by owner Q through the push-buttons/keys on the phone set, and are to be stored therein.

Said apparatus generates automatic answering voices, like "Sorry. Nobody is around at this time. I am paging him now. Please do not hang up", which are factory-prerecorded. The voice instructions whereby a paging centre is notified, "call xxxx, at phone number xxxxxxxx", etc., are input through the owner's handset into the memory of the answering apparatus by the owner, and are kept by the standby battery therein and unlikely to be lost. The stored voice instructions can be in any language of the world.

PROCESS 2

One set of apparatus for automatic locating and answering is installed for service to a plurality of member of staff, Q1, Q2, Q3, Q4 . . . , in an organisation or a company. In this case it is possible to add on the apparatus a line-switching key for connecting line Ta with the telephone in socket T.

First of all, the apparatus has to memorise the personal paging information for each of the owners Q1, Q2, . . . , including phone numbers of the paging centre and call numbers. Then, each owner is assigned a liaison number, e.g. 01 for owner Q1, 02 for owner Q2, 03 for owner Q3, ... and so on. The liaison number is arbitrarily assigned merely to the effect of each owner being identifiable.

The caller K is now desirous of dialling up Q3 via line Ta. After K dials up the apparatus for automatic locating and answering, caller K presses the "0" and "3" buttons {on the phone set}. The apparatus makes use of the paging information for 03, relays the corresponding signals to a paging centre via line Tb, and the centre passes the signals on to owner Q3. Q3 knows from his pager that someone looks for him through his apparatus for automatic telephone locating, and he dials up the line Tb. At this juncture, the apparatus connects Ta with Tb, to realise the direct conversation between Q3 and the caller K. If Q3 is near the apparatus, he may press the "line-switching key" on the apparatus to connect line Ta with the telephone in socket T, so that Q3 may talk to K using the handset of telephone T. If Q3 fails to get through to his apparatus for automatic telephone locating within a predetermined time period, then, like process 1, the apparatus dials up the paging centre again via line Tb, so that K leaves a message at the paging centre, which notifies the owner Q3, who then decides whether he should talk to caller K.

PROCESS 3

A process using the apparatus for automatic telephone locating, for two CT-2 telephones to hold direct conversation.

The advent of a second generation cordless telephone CT-2, which is relatively less expensive, has been gaining more and more popularity. The CT-2 is operating within an area covered by the so-called telepoint. Dialling on CT-2 will have the telepoint feeding the information into public network, to achieve the goal of dial-up conversation. However, CT-2 makes connection unidirectionally, that is, one can only dial up a receiving party by CT-2, whereas the receiving party can by no means dial up the CT-2. Then CT-2 operates like a mobile phone booth. By means of the present invention, two CT-2 can talk to each other. One set of CT-2 dials up line Ta, and the apparatus for automatic telephone locating and answering locates the receiver via line Tb, by the process 1 or 2. Hence the receiver may use a second set of CT-2, that dials up line Tb, to make connection and hold conversation.

Figure 4:
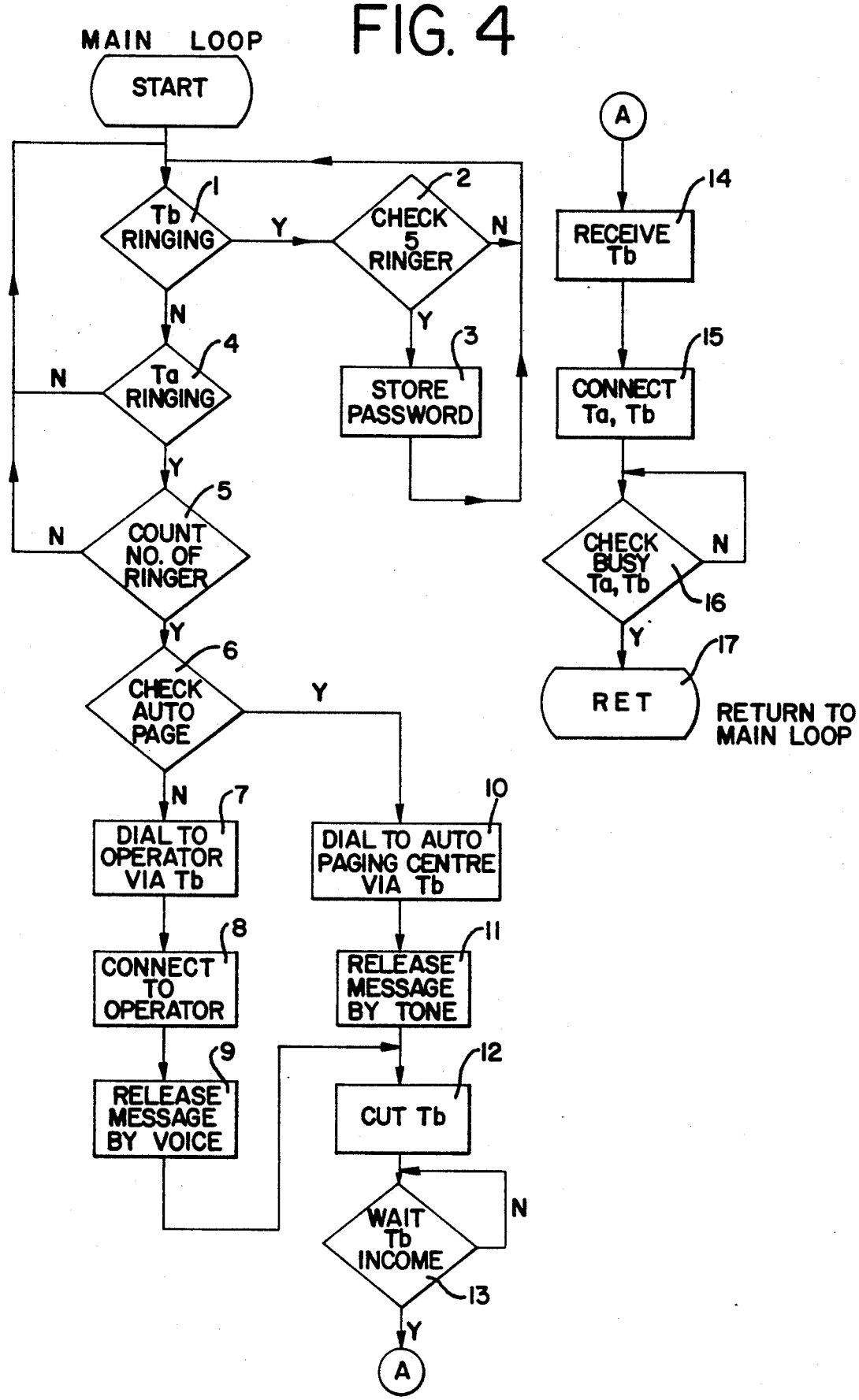
FIG. 4 is the main flowchart of software that carries out the present invention of the method of automatic telephone locating and answering.

FIG. 4 is the flowchart of the main software loops for the present invention of the apparatus.

To begin the process, in step 1, line Tb is first checked for the connection with a telephone set. If yes (in our embodiment example, checking Tb makes a bell ring five times to confirm Tb being connected), then, with line Tb connected, the process goes to step 3, that allows the modification of password, of the paging centre phone number (to be entered via handset push-buttons), and of the pager call number, and the prerecording of the answering voice. On completion of all these, the apparatus returns to START.

When Tb is unconnected, the process checks line Ta (step 4), if unconnected, then goes to START, and if connected, then counts the number of times that the bell rings so that Ta can be confirmed having connection, and the apparatus enters into automatic answering, and requesting the caller to wait while music is played. The process goes on to check the type of paging centre and to dial up the centre via line Tb. If a voice retrieval terminal is employed in the paging centre, the automatic paging is accomplished by the system releasing message in terms of tones. If operators are employed, the apparatus releases message to the paging centre by voice (steps 6-11). After these, line Tb is cut and awaits incoming reply on Tb (steps 12-13) by the owner. As soon as the owner's reply is received, lines Ta and Tb are connected and monitored. After both lines have been relinquished, the process then returns to START (steps 14-17).

The above have been the main loops in software execution. As a matter of fact, during the time of awaiting owner's reply, if the time exceeds a predetermined length, the present invention of the apparatus for automatic locating and answering will re-dial the paging centre via Tb, and have Ta and Tb connected allowing the caller to leave message with the paging centre. After this the process returns to START.

Also when the Ta connection is confirmed, and the caller is awaiting owners reply, the system, besides operating according the flowchart, monitors from time to time whether the telephone in T is answered. If yes, then the system pauses after connecting Ta with T for conversation. The system then monitors Ta: when Ta hangs up, the process returns to START.

I claim:

1. A method of private telephone automatic locating and answering, comprising the following sequential steps:
   A. the apparatus for automatic locating and answering basically works with two telephone lines, the caller dials the number of a receiver's "apparatus for automatic locating and answering", and connects his phone with the apparatus on one of the two telephone lines;
   B. conversation may be held with the caller immediately using the handset provided on the apparatus;
   C. if within a predetermined period of time, no one answers the call over the phone on the apparatus, said apparatus then keeps in contact with the caller, and at the same time on another phone line dials up a paging centre, leaves a verbal message, and hangs up to wait for the receiver's response;
   D. the paging centre calls the receiver, telling him that someone is waiting to talk to him through the receiver's apparatus for automatic locating and answering;
   E. the receiver dials up his own automatic telephone locating and answering apparatus, which connects the two incoming telephone lines, in other words, the caller has put through his line to the receiver; and
   F. if the receiver does not respond to his "apparatus for automatic telephone locating and answering" within a predetermined period of time, said apparatus once again dials the paging centre, requesting the caller to directly leave a verbal message with the paging centre; the receiver, after getting the paging message at the second time and on being able to identify the caller, may choose either to call back or to take no action.

2. A method of automatic telephone locating and answering as claimed in claim 1, wherein one said apparatus for automatic telephone locating and answering serving a plurality of owners/receivers, characterized in that said each owner/receiver is assigned a liaison number, and corresponding telephone information is stored in the apparatus, after completing Step A above, the caller keys-in the receiver's liaison number through pressing the keys on a telephone set.

3. A method of automatic telephone locating and answering, as claimed in claim 1, characterized in that the telephone information of the receiver is pre-recorded through the keys in extension telephone sets connected with the automatic locating and answering apparatus, and is stored therein.

4. An apparatus for private telephone automatic locating and answering, to carry out the method claimed in claim 1, comprising:
- a CPU system, responsible for executing programs, storing automatic answering voice and musical data, and controlling the operation of other parts of the apparatus,
- a voice D/A and A/D converter, controlled by the CPU system, for converting the CPU-stored automatic answering voice and musical data into analog signals, transmitting them to telephone interface, and for converting voice and music into digital data (when pre-recording the voice and music) and store them in the CPU system RAM,
- a telephone interface, controlled by the CPU system, for turning the analog signals that come from the voice D/A converter into voice, and practicing the connection with the telephone network; having three sockets: one for owner's private telephone, and two for connecting with two telephone lines (C.O. lines or extension lines), and
- a front panel, connected with the CPU, having a plurality of pilot lamps, for indication of the operational status of said apparatus.

5. An apparatus for private telephone automatic locating and answering, as claimed in claim 4, wherein said CPU system comprises
- a Z8 CPU for executing the programs and handling data processing,
- a ROM for storing all command instructions,
- a RAM for storing various telephone information,
- a battery for supplying electric power to said RAM,
- a logic circuit connected with various functional components, and
- an audio generator storing and generating answering voice and music.

6. An apparatus for private telephone automatic locating and answering, as claimed in claim 4, wherein said front panel has a plurality of pilot lamps including: power indicator, error indicator, readiness indicator, program-loaded indicator, and indicators for the two telephone lines.

7. An apparatus for private telephone automatic locating and answering, as claimed in claim 4, wherein said telephone interface includes:
- a telephone coupling transformer,
- tone detectors monitoring the status of telephone lines (busy, ringing, etc.),
- DTMF decoder and tone/pulse dialer that convert codes, input to the system from DTMF phone keys, into decoded data.

* * * * *

UNITED STATES PATENT AND TRADEMARK OFFICE
CERTIFICATE OF CORRECTION

PATENT NO. : 5,208,849
DATED : May 4, 1993
INVENTOR(S) : WONG K. FU

It is certified that error appears in the above-identified patent and that said Letters Patent is hereby corrected as shown below:

Column 2, line 43, please delete "A, when" and substitute therefor --that, the apparatus hooks up the two lines. When--.

Signed and Sealed this

Third Day of May, 1994

Attest:

BRUCE LEHMAN

*Attesting Officer*    *Commissioner of Patents and Trademarks*